United States Patent
Kang et al.

(10) Patent No.: US 12,332,787 B2
(45) Date of Patent: Jun. 17, 2025

(54) MEMORY SYSTEM PERFORMING CACHE BYPASSING OPERATION AND CACHE MANAGEMENT METHOD THEREOF

(71) Applicant: Samsung Electronics Co., Ltd., Suwon-si (KR)

(72) Inventors: Shinhaeng Kang, Suwon-si (KR); Suk Han Lee, Suwon-si (KR); Kyomin Sohn, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 63 days.

(21) Appl. No.: 18/339,488

(22) Filed: Jun. 22, 2023

(65) Prior Publication Data
US 2024/0256452 A1 Aug. 1, 2024

(30) Foreign Application Priority Data
Jan. 30, 2023 (KR) ........................ 10-2023-0011781

(51) Int. Cl.
*G06F 12/0811* (2016.01)
*G06F 12/0891* (2016.01)

(52) U.S. Cl.
CPC ...... *G06F 12/0811* (2013.01); *G06F 12/0891* (2013.01)

(58) Field of Classification Search
CPC ............ G06F 12/0811; G06F 12/0891; G06F 12/0804; G06F 2212/1028; G06F 12/0888; G06F 3/0658; G06F 2212/60
See application file for complete search history.

(56) References Cited

U.S. PATENT DOCUMENTS

| | | | |
|---|---|---|---|
| 6,327,643 B1 | 12/2001 | Egan | |
| 7,027,064 B2 | 4/2006 | Lavelle et al. | |
| 7,502,889 B2 | 3/2009 | Sistla | |
| 7,716,411 B2 | 5/2010 | Panabaker et al. | |
| 8,140,767 B2 | 3/2012 | Bell et al. | |
| 9,213,647 B2 | 12/2015 | Goodman et al. | |
| 9,727,475 B2 | 8/2017 | Pal et al. | |
| 10,289,558 B2 | 5/2019 | Kamruzzaman | |
| 10,552,325 B2 | 2/2020 | Kamruzzaman | |
| 2008/0046736 A1* | 2/2008 | Arimilli | G06F 12/0888 713/176 |
| 2014/0146589 A1 | 5/2014 | Park et al. | |
| 2015/0242308 A1 | 8/2015 | Kim et al. | |

(Continued)

FOREIGN PATENT DOCUMENTS

| | | |
|---|---|---|
| CN | 113989099 A | 1/2022 |
| TW | 201804328 A | 2/2018 |

*Primary Examiner* — Zhuo H Li
(74) *Attorney, Agent, or Firm* — Myers Bigel, P.A.

(57) ABSTRACT

Disclosed is a semiconductor memory device and a memory system, including at least one high-bandwidth memory device configured to store data or output stored data according to an access command, a processor configured to generate the access command for the high-bandwidth memory device, and a logic die on the high-bandwidth memory device and including a last level cache providing a cache function to the processor. The last level cache is configured to perform a cache bypassing operation to directly access the high-bandwidth memory device without a cache replacement operation when an invalid line and a clean line do not exist in a cache miss state in response to a cache read or cache write request by the processor.

17 Claims, 11 Drawing Sheets

(56) References Cited

U.S. PATENT DOCUMENTS

| | | |
|---|---|---|
| 2017/0168957 A1 | 6/2017 | Christidis |
| 2019/0095328 A1* | 3/2019 | Naeimi ............... G06F 12/0897 |
| 2021/0326137 A1 | 10/2021 | Kerr et al. |
| 2022/0308998 A1 | 9/2022 | Sasanka et al. |
| 2023/0359556 A1* | 11/2023 | Kotra .................. G06F 12/0811 |
| 2024/0086325 A1* | 3/2024 | Song ..................... G06F 12/123 |

* cited by examiner

MEMORY SYSTEM PERFORMING CACHE BYPASSING OPERATION AND CACHE MANAGEMENT METHOD THEREOF

CROSS-REFERENCE TO RELATED APPLICATIONS

This application claims priority under 35 U.S.C. § 119 to Korean Patent Application No. 10-2023-0011781 filed on Jan. 30, 2023, in the Korean Intellectual Property Office, the disclosures of which are incorporated by reference herein in their entireties.

BACKGROUND

Embodiments of the present disclosure described herein relates to a semiconductor device, and more particularly, to a memory system performing a cache bypassing operation and a cache management method thereof.

According to the demand for high performance and high capacity, the integration degree of semiconductor memory devices is increasing and the operating speed is rapidly increasing. Various applications, such as deep neural networks that utilize DRAM, require large computational power and processing speed to increase the training accuracy of a data set. For these applications, high memory bandwidth is becoming critically important. One of the memory technologies to meet these demands is high bandwidth memory HBM.

In a memory system including a high-bandwidth memory HBM implemented as a stacked memory, a logic die (or buffer die) is disposed between a processor and the high-bandwidth memory HBM. The logic die may include interface circuits, buffers, and cache memory used as the last level cache LLC of the processor. In the cache management policy of the logic die, the cache memory must be managed in a write-back manner for performance. However, when performing a cache replacement policy such as LRU (Least Recently Used) or FIFO (First-In-First-Out), high-bandwidth memory HBM increases the number of commands that are used. Accordingly, the control of the cache and the high bandwidth memory HBM becomes complicated, and a delay for processing commands occurs.

SUMMARY

Embodiments of the present disclosure provides a logic die capable of increasing cache efficiency by minimizing write-back of a cache memory, a memory system including the same, and a cache management method thereof.

According to some embodiments, a memory system includes at least one high-bandwidth memory device configured to store data or output stored data according to an access command, a processor configured to generate the access command for the high-bandwidth memory device, and a logic die on the high-bandwidth memory device and including a last level cache that is configured to provide a cache function to the processor. The last level cache is configured to perform a cache bypassing operation to directly access the high-bandwidth memory device without a cache replacement operation when an invalid line and a clean line do not exist in a cache miss state in response to a cache read or cache write request by the processor.

According to some embodiments, a method for managing a cache memory included in a buffer die of a high-bandwidth memory includes receiving a cache request from a processor, determining a cache miss based on a set index and a tag information included in the cache request, identifying whether an invalid line or a clean line exists among cache lines corresponding to the set index, when the cache miss has been determined, and when the invalid line or the clean line does not exist, writing cache requested data to the high-bandwidth memory by bypassing the cache memory and transferring the cache requested data to the processor from the high-bandwidth memory.

According to some embodiments, a memory system includes a memory device configured to store or output data according to an access command, a processor configured to generate the access command for the memory device, and a cache memory configured to provide a cache function to the processor and configured to manage a plurality of cache lines according to a cache replacement policy. When an invalid line and a clean line do not exist in the plurality of cache lines after a cache miss, the cache memory is configured to perform a cache bypassing operation to directly access the memory device without replacing a cache in response to a cache read request or cache write request from the processor.

BRIEF DESCRIPTION OF THE FIGURES

The above and other objects and features of the present disclosure will become apparent by describing in detail embodiments thereof with reference to the accompanying drawings.

DETAILED DESCRIPTION

It is to be understood that both the foregoing general description and the following detailed description are examples, and it is to be considered that an additional description of the claimed invention is provided. Reference signs are indicated in detail in some embodiments of the present invention, examples of which are indicated in the reference drawings. Wherever possible, the same reference numbers are used in the description and drawings to refer to the same or like parts.

Figure 1:
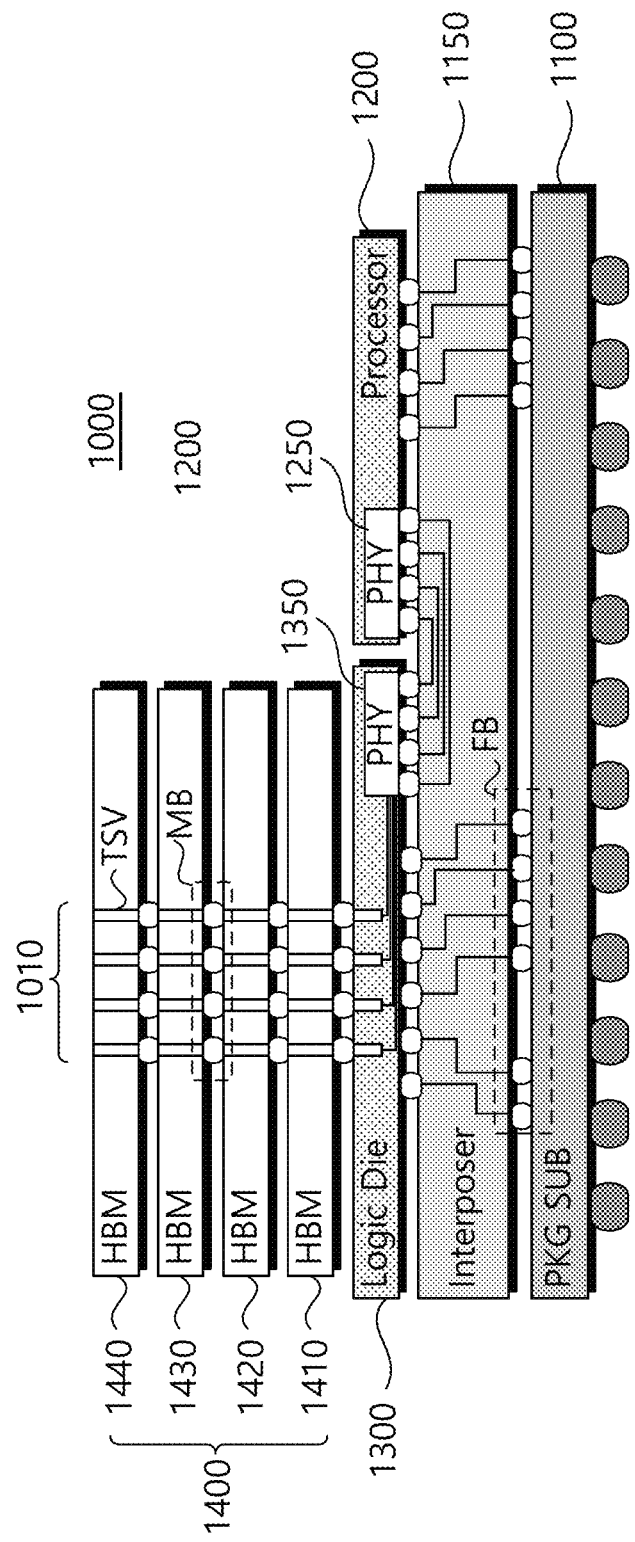
FIG. 1 is a block diagram illustrating a memory system including a logic die according to some embodiments of the inventive concept.

FIG. 1 is a block diagram illustrating a memory system including a logic die according to some embodiments of the inventive concept. Referring to FIG. 1, a memory system 1000 implemented as a stacked memory may include a PCB substrate 1100, an interposer 1150, a processor 1200, a logic die 1300, and a high-bandwidth memory (HBM, 1400). The high-bandwidth memory 1400 may include a plurality of HBM dies 1410, 1420, 1430, and 1440. These elements of the memory system may be implemented as circuits that include hardware and/or software.

The memory system 1000 connects HBM dies 1410, 1420, 1430, and 1440 to the processor 1200 using an interposer 1150. The interposer 1150 is disposed on the PCB substrate 1100 and is electrically connected to the PCB substrate 1100 through flip chip bumps FB. The processor 1200 may be in a separate dies from the logic die 1300. The interposer 1150 may connect the logic die 1300 and the processor 1200. The interposer 1150 may connect between the physical layer 1350 of the logic die 1300 and the physical layer 1250 of the processor 1200 and provide physical paths formed using conductive materials. Accordingly, the logic die 1300 and the processor 1200 may 1200 may be stacked on the interposer 1150 to transmit/receive signals to each other.

A processor 1200, a logic die 1300, and stacked HBM dies 1410, 1420, 1430, and 1440 may be disposed on the interposer 1150. To implement a memory system, through-silicon via TSV lines are formed in the plurality of HBM dies 1410, 1420, 1430, and 1440. The TSV lines may be electrically connected to micro bumps MBs formed between the plurality of HBM dies 1410, 1420, 1430, and 1440.

Although the high-bandwidth memory 1400 is shown as including four HBM dies 1410, 1420, 1430, and 1440, the number of HBM dies may vary. For example, high-bandwidth memory 1400 configured in a stacked fashion may include 8, 12 or 16 HBM dies. The logic die 1300 and the HBM dies 1410, 1420, 1430, and 1440 may 1440 may be stacked and electrically connected to each other through TSVs. Accordingly, the memory system 1000 may have a 3D memory structure in which a plurality of dies including logic die 1300 and the HBM dies 1410 to 1440 are stacked. For example, the memory system 1000 may be implemented based on HBM or Hybrid Memory Cube (HMC) standards.

Logic die 1300 and HBM dies 1410, 1420, 1430, and 1440 may include TSV region 1010. The TSVs configured to pass through the dies 1300 and 1410 to 1440 may 1440 may be disposed in the TSV region 1010. The logic die 1300 may transmit and receive signals and/or data to and from the HBM dies 1410, 1420, 1430, and 1440 through TSVs. Each of the HBM dies 1410, 1420, 1430, and 1440 may transmit and receive signals and/or data to and from the logic die 1300 through TSVs. In this case, signals and/or data may be independently transmitted and received through corresponding TSVs for each channel. For example, the processor 1200 may transmit a command and an address through a first channel CH0 to access a memory cell of the first HBM die 1410. In this case, the logic die 1300 may access the memory cell of the first channel CH0 by transmitting control signals to the first HBM die 1410 through TSVs corresponding to the first channel CH0.

The logic die 1300 may include a physical layer (PHY, 1350). The physical layer 1350 may include interface circuits for communication with the processor 1200. For example, the physical layer 1350 may include interface circuits corresponding to a host interface. Signals and/or data received via the physical layer 1350 may 1350 may be passed to HBM dies 1410, 1420, 1430, 1440 via TSVs.

In an example embodiment, the logic die 1300 may include a channel controller corresponding to each of the channels. A channel controller may manage the memory referencing operations of the corresponding channel and may determine the timing requirements of the corresponding channel. In an example embodiment, logic die 1300 may include a plurality of pins for receiving signals from processor 1200. The logic die 1300 receives a clock signal CK, a command/address signal C/A, a write data strobe signal WDQS, and a data signal DQ through a plurality of pins. The logic die 1300 transmits read data strobe signal RDQS and a data signal DQ through a plurality of pins. For example, the logic die 1300 includes two pins for receiving a clock signal CK, 14 pins for receiving a command/address signal C/A, and a write data strobe signal WDQS for each channel. It may include 8 pins for receiving, 8 pins for transmitting a read data strobe signal RDQS, and 128 pins for transmitting and receiving a data signal DQ.

In particular, the logic die 1300 may provide interface circuits and buffer functions between the processor 1200 and the HBM dies 1410, 1420, 1430, and 1440. Also, the logic die 1300 may provide a last level cache LLC function of the processor 1200. The logic die 1300 may also be referred to as an interface die, a base die, a buffer die, a master die, or the like. The logic die 1300 may include a cache memory (e.g., SRAM) and a cache controller to be used as the last level cache LLC of the processor 1200. The cache controller may be referred to as a cache controller circuit that is implemented with hardware and/or software. The last level cache LLC provided by the logic die 1300 provides a function capable of minimizing write-back of the cache memory.

The last level cache LLC of the present invention operates according to a cache replacement policy corresponding to a cache bypassing function. That is, when a clean line exists among cache lines, the last level cache LLC fills the clean line with new cache data. However, when the clean line no longer exists, the last level cache LLC performs a cache bypassing function instead of replacing one of the cache lines. Here, the clean line refers to a cache line identical to or similar to main memory data. That is, the data of the clean line refers to a cache line containing un-updated data. On the other hand, a dirty line refers to a cache line in which the data of the cache line is updated and the data of the main memory is not changed. According to cache bypassing, data exchange between a main memory (e.g., HBM or DRAM) and a cache memory for replacing a cache is skipped. Further, it refers to an operation in which write-requested data or read-requested cache data is directly written to or read from the main memory without passing through the cache memory.

The last level cache LLC of the present invention skips the access to the cache memory and directly accesses the DRAM when the clean line no longer exists. When performing algorithms such as LRU or FIFO commonly used for cache replacement, the number of commands issued to the main memory (HBM or DRAM) increases rapidly depending on the location of the victim line and the target line. A victim line may be one of the cache lines that is selected when there is no clean line of the cache available. In some embodiments, the victim line is a cache line that is in a dirty state where the main memory has not been updated. A cache controller may write write-requested data using the victim line as a target line. In addition, the complexity of scheduling increases because the number of commands to be issued to the main memory is not constant according to the state of the cache. However, if a cache bypassing function is used, the number of added commands can be drastically reduced, and the number of commands issued to the main memory can be easily estimated.

As described above, highly efficient cache management is possible through a cache bypassing function provided by the LLC of the logic die 1300.

Figure 2:
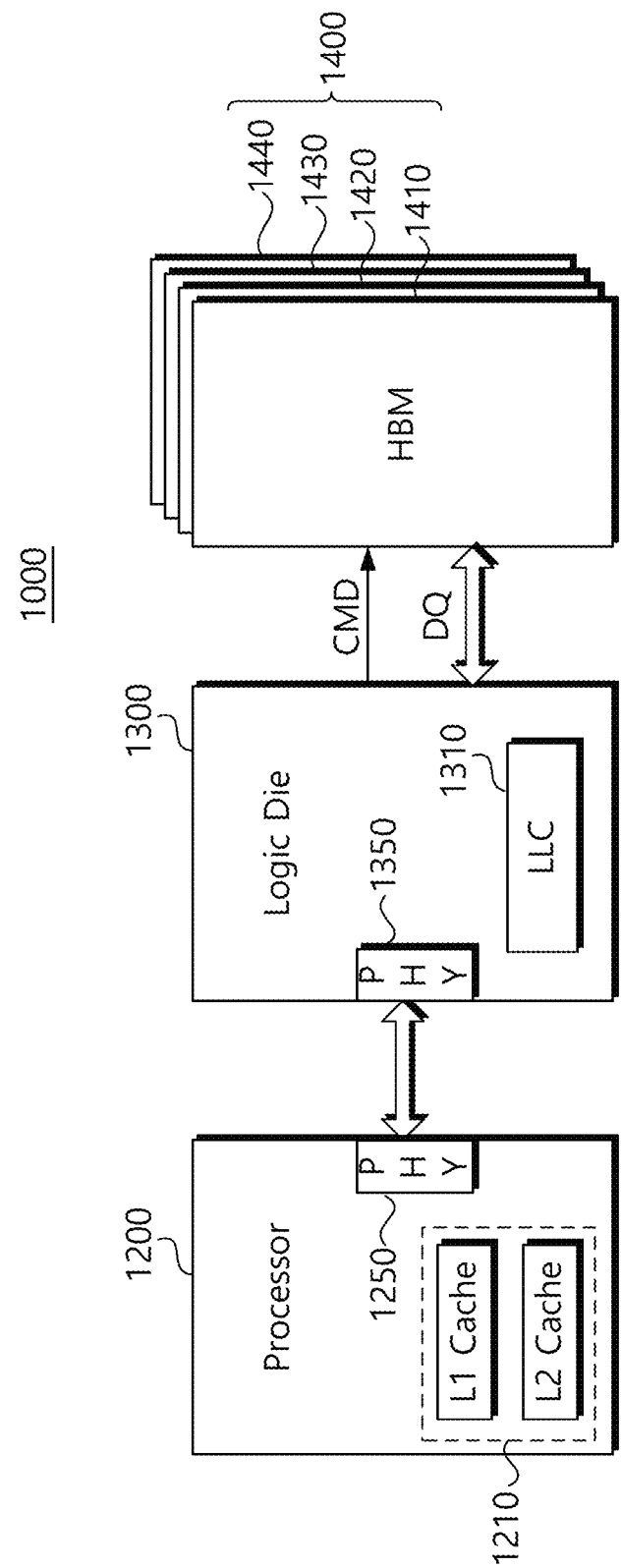
FIG. 2 is a block diagram showing configurations of the memory system of FIG. 1.

FIG. 2 is a block diagram showing configurations of the memory system of FIG. 1. Referring to FIG. 2, a memory system 1000 includes a processor 1200, a logic die 1300, and a high-bandwidth memory 1400.

The processor 1200 may execute applications supported by the memory system 1000 using the high-bandwidth memory 1400. For example, the processor 1200 may include at least one of a central processing unit CPU, an application processor AP, a graphic processing unit GPU, a neural processing unit NPU, a tensor processing unit TPU, a vision processing unit VPU, an image signal processor ISP and a digital signal processor DSP to execute specialized operations.

The processor 1200 may include a cache 1210 and a physical layer 1250. The cache 1210 built into the processor 1200 may include a primary cache L1 cache and a secondary cache L2 cache. In some cases, the cache 1210 may further include an L3 cache. The physical layer 1250 may include input/output circuits for transmitting and receiving signals to and from the physical layer 1350 of the logic die 1300. The processor 1200 may provide various signals to the physical layer 1350 of the logic die 1300 through the physical layer 1250. Signals provided to the physical layer 1350 may 1350 may be transmitted to the plurality of HBMs 1410, 1420, 1430, and 1440 through interface circuits and TSVs of the physical layer 1350.

The logic die 1300 may include a last level cache 1310 of the processor 1200. For example, when the internal cache 1210 of the processor 1200 supports up to the second cache (L2 cache), the last level cache 1310 of the logic die 1300 can be used as the third level cache (L3 cache) of the processor 1200.

As described above, the last level cache 1310 performs a cache replacement policy including a cache bypassing function. The last level cache 1310 fills a clean line with new cache data among cache lines for cache replacement. However, in a situation where there is no clean line, the last level cache 1310 performs a cache bypassing function instead of replacing the cache line.

Cache bypassing is an operation of directly writing or reading write-requested data or read-requested cache data to the high-bandwidth memory 1400 without reading or writing to the last level cache 1310 for replacing the cache. That is, the last level cache 1310 skips the management of cache lines and directly accesses the high bandwidth memory 1400 when there are no more clean lines. When an algorithm such as LRU or FIFO generally used for cache replacement is performed, the number of commands issued to the high-bandwidth memory 1400 increases rapidly according to locations of victim lines and target lines in the high-bandwidth memory 1400. However, if a cache bypassing scheme is used, the number of added commands CMDs can be drastically reduced.

Each of the plurality of HBMs 1410, 1420, 1430, and 1440 included in the high-bandwidth memory 1400 may be implemented based on the HBM standard. However, the present invention is not limited thereto, and each of the plurality of HBMs 1410, 1420, 1430, and 1440 may be implemented based on Graphic Double Data Rate (GDDR), Hybrid Memory Cube (HMC), or Wide I/O standards.

Figure 3:
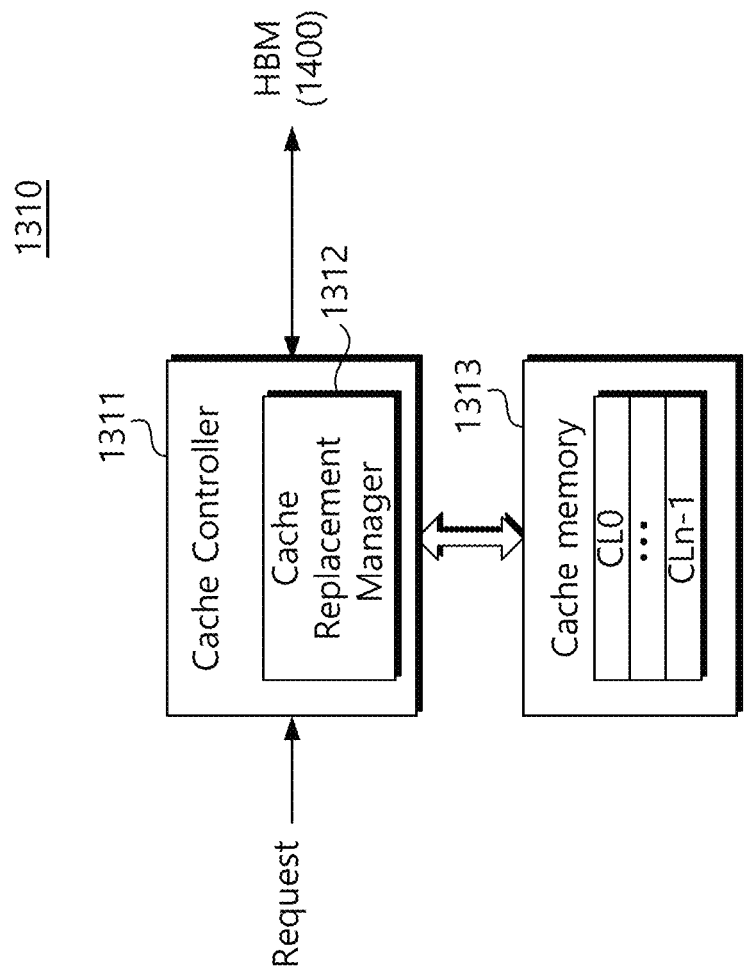
FIG. 3 is a block diagram showing the configuration of the last level cache LLC of FIG. 2.

FIG. 3 is a block diagram showing the configuration of the last level cache of FIG. 2. Referring to FIG. 3, the last level cache 1310 may include a cache controller 1311 and a cache memory 1313. Here, the cache memory 1313 may be implemented with SRAM, but the present invention is not limited to the disclosure herein.

The cache controller 1311 controls the cache memory 1313 to provide a cache function according to a memory request of the processor 1200. The cache controller 1311 may search whether given data exists in the last level cache 1310 according to a memory request of the processor 1200. To this end, the cache controller 1311 identifies whether the requested data exists in the cache using a set index, tag, or the like. That is, the cache controller 1311 identifies a cache hit or cache miss of the requested data. Also, the cache controller 1311 may arrange a plurality of cache lines in one set index according to a cache placement policy. Hereinafter, for convenience of description, a 2-set associative cache in which two cache lines are disposed in one set index will be described as an example.

The cache controller 1311 may include a cache replacement manager 1312 that performs a cache bypassing function. The cache replacement manager 1312 may be referred to as a cache replacement manager circuit that is implemented with hardware and/or software. The cache replacement manager 1312 may control the cache memory 1313 configuring the cache memory in a LRU (Least Recently Used) or FIFO (First-In-First-Out) manner. When a cache miss occurs, the cache replacement manager 1312 fills a clean line with new cache data among cache lines corresponding to the input set index. However, in a situation where there is no clean line, the cache replacement manager 1312 selects one of the cache lines (victim line). Generally, if the victim line in the selected dirty state is valid, the cache controller 1311 writes the victim line into the high-bandwidth memory 1400, which is the main memory, and fetches the write-requested data from the main memory and writes the data to the victim line.

However, the cache replacement manager 1312 of the present invention performs a cache bypassing function instead of replacing a cache line in a situation where a clean line does not exist. That is, the cache replacement manager 1312 directly writes write-requested data into the high-bandwidth memory 1400 without writing it into the cache memory 1313. In some embodiments, the cache replacement manager 1312 may 1312 may directly read read-requested data from the high-bandwidth memory 1400 to transfer the read-requested data to the processor 1200 without passing through the cache memory 1313. That is, the cache replacement manager 1312 may directly write write-requested data into the high-bandwidth memory 1400 in a situation where a clean line does not exist. In some embodiments, the cache replacement manager 1312 may 1312 may directly read read-requested data from the high-bandwidth memory 1400 in a situation where a clean line does not exist. That is, the cache replacement manager 1312 directly accesses the high-bandwidth memory 1400 by skipping the management of cache lines when there are no more clean lines.

According to the last level cache 1310 of the present invention described above, when performing a cache replacement policy, the number of DRAM commands issued according to the location of the victim line and the target line can be drastically reduced.

Figure 4:
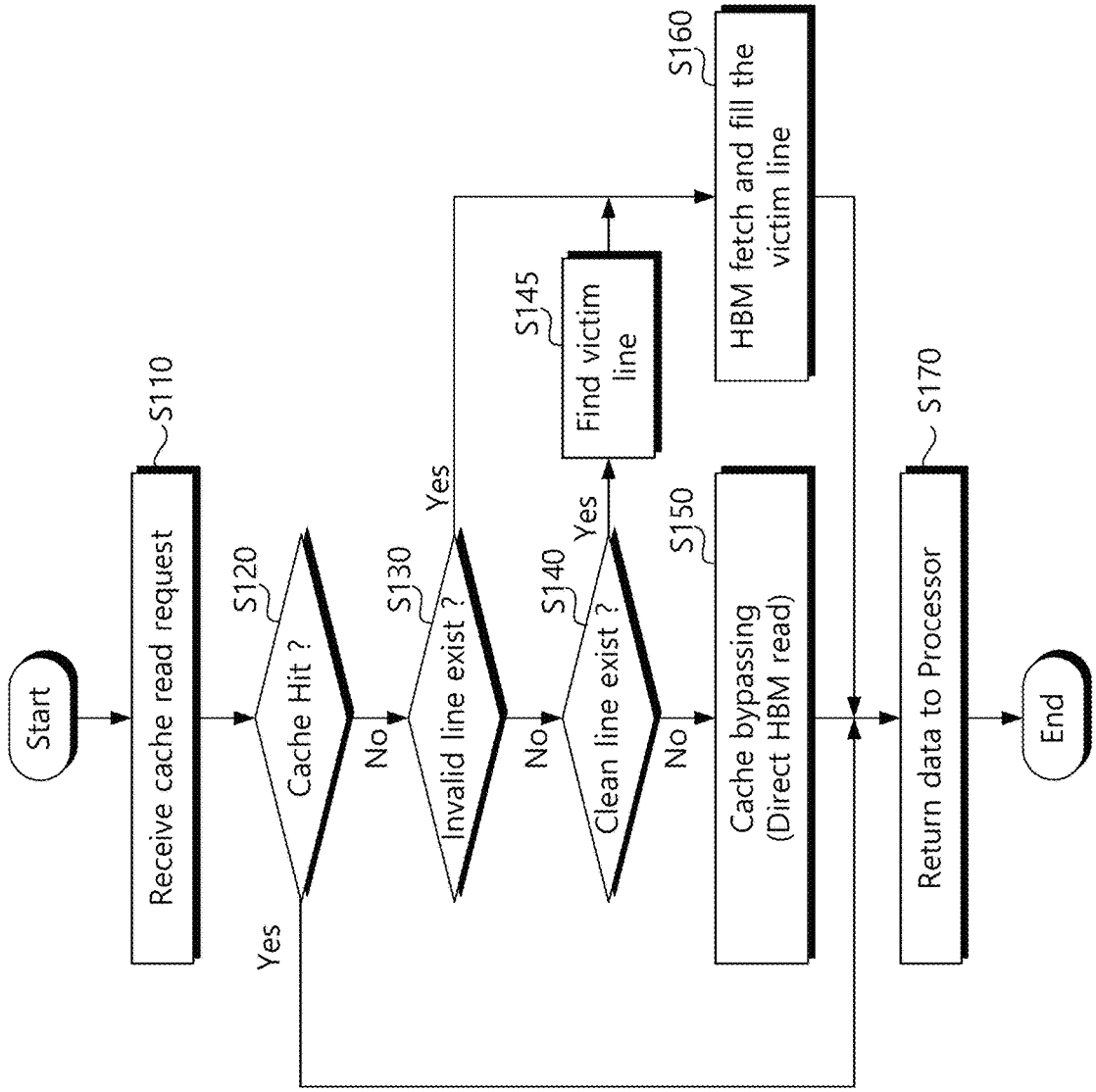
FIG. 4 is a flowchart illustrating a cache bypass operation of the present invention applied during a cache read operation.

FIG. 4 is a flowchart illustrating a cache bypass operation of the present invention applied during a cache read operation. Referring to FIGS. 3 and 4, in the last level cache 1310 of the present invention, cache bypassing occurs instead of cache replacement in a situation where a clean line does not exist.

In step S110, the cache controller 1311 receives a cache read request. Here, the cache read request includes the memory address of the read-requested data. A memory address includes a tag and a set index. The cache controller 1311 determines whether the read-requested data is a cache hit or a cache miss by utilizing a tag and a set index.

In step S120, the cache controller 1311 performs a branch operation according to the cache search result. If the read-requested data is a cache hit ('Yes' direction), the procedure moves to step S170. On the other hand, in the case of a cache miss of the read-requested data ('No' direction), the procedure moves to step S130.

In step S130, the cache controller 1311 searches whether invalid lines for cache replacement exist. The cache controller 1311 searches for a cache line whose state of a valid bit is logic '0' among cache lines. When the state of the valid bit is logic '1', it means that the state of the data stored in the cache line is valid. On the other hand, when the state of the valid bit is logic '0', it means that the data stored in the cache line is invalid data. If an invalid line exists ('Yes' direction), the procedure moves to step S160. On the other hand, if the invalid line does not exist ('No' direction), the procedure moves to step S140.

In step S140, the cache controller 1311 searches whether a clean line for replacing the cache exists. The cache controller 1311 searches for a cache line whose dirty bit state is logic '0' among cache lines. When the state of the dirty bit is logic '1', it means that the data stored in the cache line has not yet been written back to the main memory, that is, the high bandwidth memory 1400. Accordingly, the cache controller 1311 determines whether a clean line exists by searching for a cache line whose dirty bit state is logic '0'. If the clean line exists ('Yes' direction), the procedure moves to step S145. On the other hand, if the clean line does not exist ('No' direction), the procedure moves to step S150.

In step S145, the cache controller 1311 searches for and selects a victim line for cache replacement. In operation S160, the cache controller 1311 fetches data that does not exist in the cache from the high-bandwidth memory 1400 and writes the data to the selected victim line.

In step S150, the cache controller 1311 directly reads the read-requested data from the high-bandwidth memory 1400 without passing through the cache. This procedure eliminates the need to consider the state of the cache line, reducing the number of commands issued.

In step S170, the cache controller 1311 returns the read-requested data to the processor 1200 or the host. In this case, data read by the cache bypassing performed in step S150 may be directly transferred from the high-bandwidth memory 1400 to the processor 1200 without passing through the cache line. On the other hand, data stored in the cache line through the cache replacement in step S160 will be transferred from the corresponding cache line to the processor 1200.

In the foregoing, the cache bypassing operation of stopping the cache replacement operation of the cache line and directly accessing the high-bandwidth memory 1400 when a cache miss occurs and a clean line no longer exists has been described. As described above, when a write-back needs to be performed because there is no clean line in the cache, the number of command issuances can be drastically reduced through the cache bypassing function. Therefore, the cache bypassing function of the present invention can provide a highly efficient cache management means.

Figure 5:
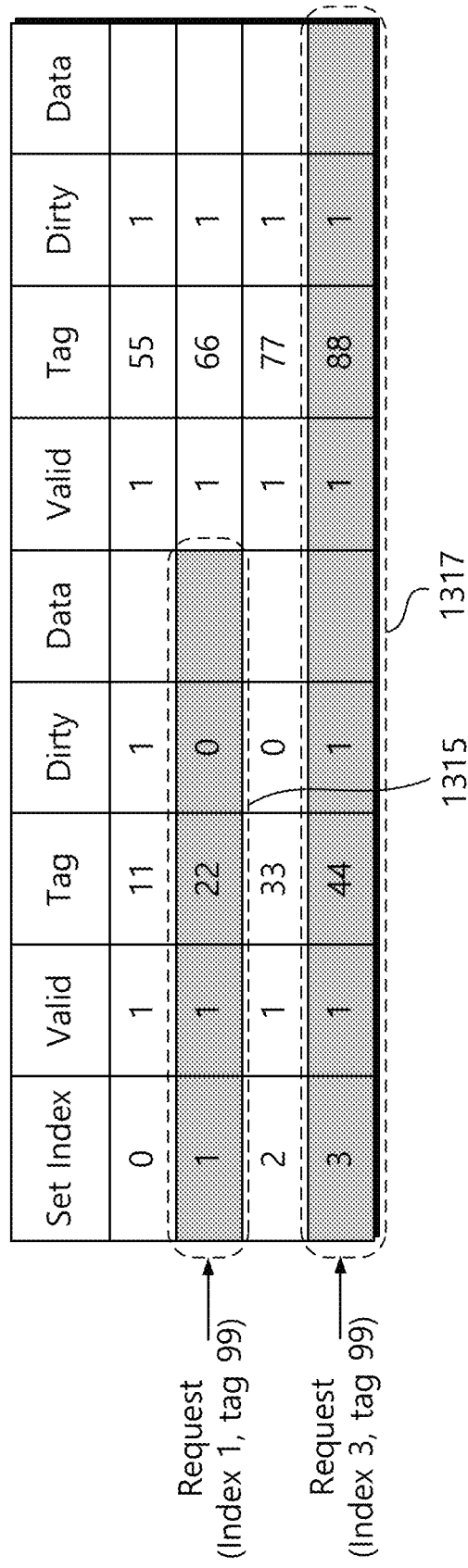
FIG. 5 is a diagram showing an example of a cache bypassing condition of the present invention.

FIG. 5 is a diagram showing an example of a cache bypassing condition of the present invention. Referring to FIG. 5, a 2-set associative cache structure in which two cache lines are allocated to one set index will be used as an example for description.

Assume that a read request corresponding to the set index '1' and the address of the tag '99' occurs. Then, the cache controller 1311 compares the input tag '99' with the tags '22' and '66' of the cache lines of the set index '1'. Since no tag identical to the read-requested tag exists in the selected set index, the cache controller 1311 determines it as a cache miss. In addition, valid bits of the cache lines of the set index '1' are all '1'. That is, there is no invalid line in the cache lines of the set index '1'. Accordingly, the cache controller 1311 checks whether a clean line exists. Among the cache lines of set index '1', there is a clean line 1315 whose dirty bit is '0'. Accordingly, the cache controller 1311 selects the clean line 1315 as the victim line to copy data of the high-bandwidth memory 1400. Data copied to the clean line 1315 will be returned to the processor 1200 again.

This time, it will be assumed that a read request corresponding to the set index '3' and the address of the tag '99' occurs. Then, the cache controller 1311 compares the input tag '99' with the tags '44' and '88' of the set index '3'. There is no tag matching the read-requested tag in the selected set index '3'. Therefore, the cache controller 1311 determines it as a cache miss.

In addition, valid bits of the cache lines of the set index '3' are all '1'. That is, there is no invalid line in the cache lines of set index '3'. Next, the cache controller 1311 checks whether the clean line exists at the set index '3'. There is no clean line whose dirty bit is '0' among the cache lines 1317 of set index '3'. Accordingly, the cache controller 1311 performs the cache bypassing operation. That is, read-requested data is directly transferred from the high-bandwidth memory 1400 to the processor 1200 without passing through the last level cache 1310 by the cache bypassing operation.

Figure 6:
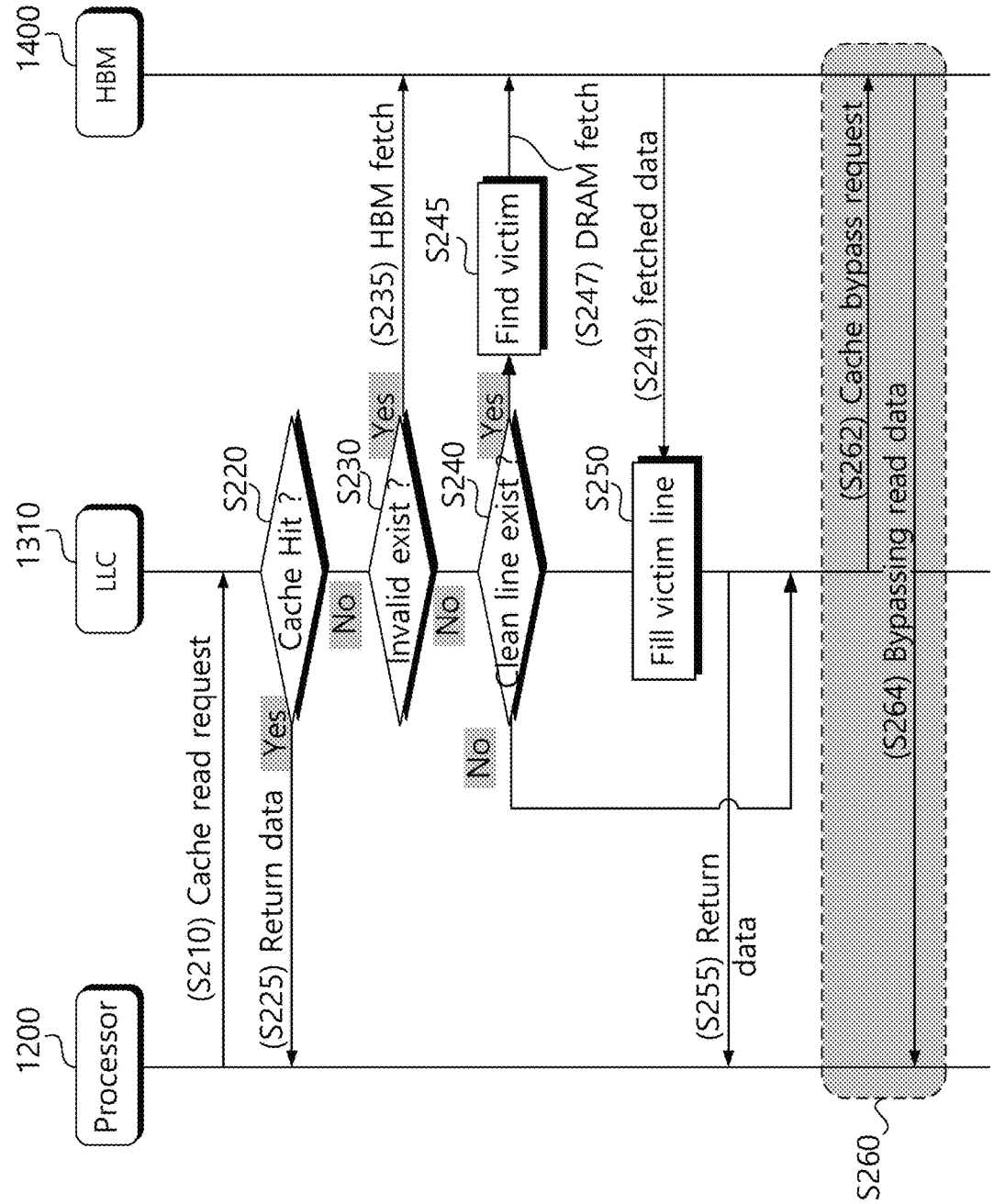
FIG. 6 is a diagram briefly illustrating cache bypassing that occurs when a cache read request is made according to some embodiments of the present invention.

FIG. 6 is a diagram briefly illustrating a cache bypassing operation that occurs when a cache read request is made according to some embodiments of the present invention. Referring to FIG. 6, if there is no clean line in a cache miss situation, the last level cache (1310, see FIG. 3) may perform cache bypassing by directly accessing the high-bandwidth memory (1400, see FIG. 2) instead of replacing the cache.

In step S210, the processor 1200 transmits a cache read request to the last level cache 1310. At this time, the read address includes a set index and a tag.

In step S220, the cache controller 1311 of LLC 1310 receives the cache read request, searches tags and set indices of cache lines, and determines a cache hit. If the matching cache line exists ('Yes' direction), the cache controller 1311 returns data of the cache line with indication of a cache hit to the processor 1200 (S225). On the other hand, in the case of a cache miss ('No' direction), the procedure moves to step S230.

In step S230, the cache controller 1311 searches whether invalid lines for cache replacement exist. If an invalid line exists ('Yes' direction), the cache controller 1311 fetches the read-requested data from the high-bandwidth memory 1400 and writes the data to the victim line (S235). The data fetched in step S249 is filled in a victim line among cache lines (S250). In step S255, the read-requested data filling the victim line will be returned to the processor 1200. On the other hand, from step S230, if the invalid line does not exist ('No' direction), the procedure moves to step S240.

In step S240, the cache controller 1311 searches whether a clean line for replacing the cache exists. If the clean line exists ('Yes' direction), the procedure moves to step S245. On the other hand, if the clean line does not exist ('No' direction), the procedure moves to step S260 for cache bypassing.

In step S245, the cache controller 1311 searches for and selects a victim line for cache replacement. In step S247, the cache controller 1311 fetches data that does not exist in the cache from the high-bandwidth memory 1400. The data fetched in step S249 is filled in a victim line among cache lines (S250). In step S255, the read-requested data filling the victim line will be returned to the processor 1200.

In step S260, the cache controller 1311 performs cache bypassing of read-requested data. For example, in step S262, the cache controller 1311 transmits a cache bypass request to the high-bandwidth memory 1400 for cache bypassing. Then, in step S264, the read-requested data may be directly transferred from the high-bandwidth memory 1400 to the processor 1200 without passing through the last level cache 1310.

As described above, the cache bypassing operation in which the cache replacement operation of the cache line is stopped, the high-bandwidth memory 1400 is directly accessed when a cache miss occurs, and a clean line does not exist has been described. When write-back is performed because there is no clean line in the cache, the number of command issuances can be drastically reduced through a cache bypassing function.

Figure 7:
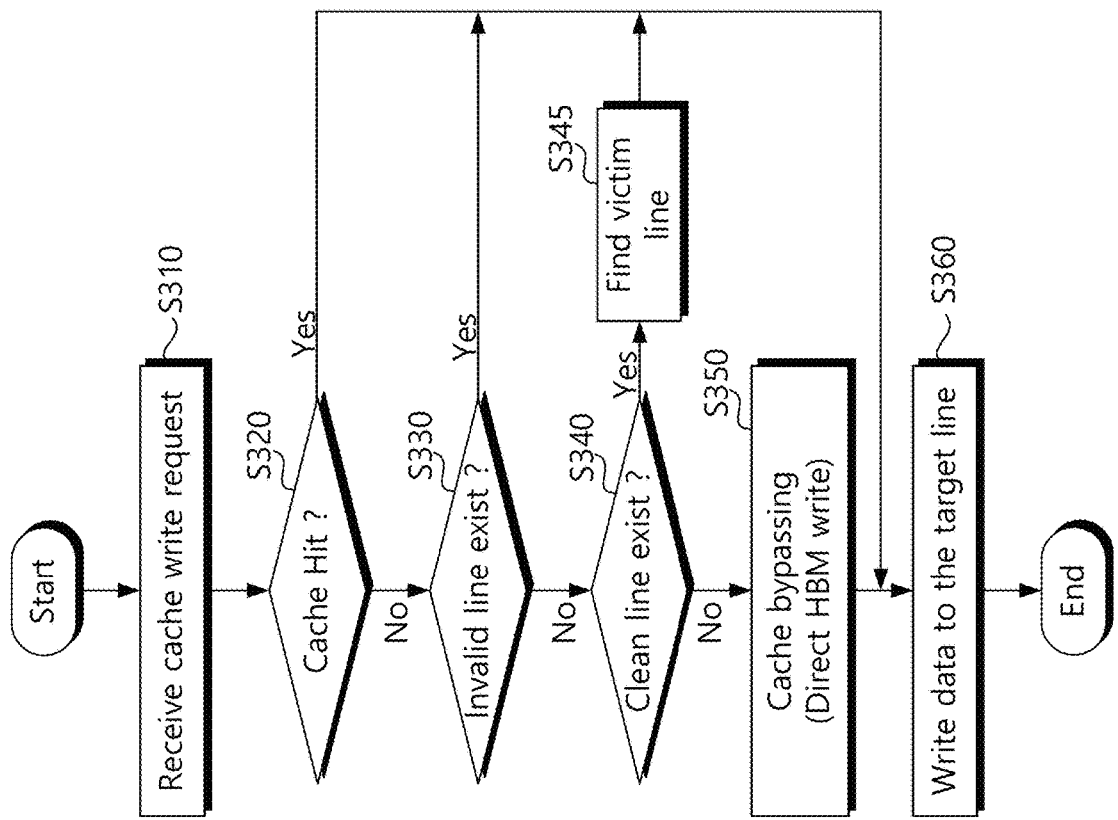
FIG. 7 is a flowchart illustrating a cache bypass operation of the present invention applied during a cache write operation.

FIG. 7 is a flowchart illustrating a cache bypass operation of the present invention applied during a cache write operation. Referring to FIGS. 3 and 7, when a clean line does not exist in the last level cache 1310 of the present invention, the cache controller 1311 performs a cache bypassing operation instead of replacing the cache.

In step S310, the cache controller 1311 receives a cache write request. Here, the cache write request includes a memory address. A memory address includes a tag and a set index. The cache controller 1311 determines whether write-requested data is a cache hit or a cache miss by utilizing a tag and a set index, as discussed in the example of FIG. 5.

In step S320, the cache controller 1311 performs an branching operation according to the cache search result. If the write-requested data is a cache hit ('Yes' direction), the procedure moves to step S360. On the other hand, if there is a cache miss of the read-requested data ('No' direction), the procedure moves to step S330.

In step S330, the cache controller 1311 searches whether there are invalid lines for cache replacement. The cache controller 1311 searches for a cache line whose state of a valid bit is logic '0' among cache lines. When the state of the valid bit is logic '1', it means that the state of the data stored in the cache line is valid. On the other hand, when the state of the valid bit is logic '0', it means that the data stored in the cache line is invalid data. If the invalid line exists ('Yes' direction), the procedure moves to step S360. On the other hand, if there is no invalid line ('No' direction), the procedure moves to step S340.

In step S340, the cache controller 1311 searches whether a clean line exists. The cache controller 1311 searches for a cache line whose dirty bit state is logic '0' among cache lines. When the state of the dirty bit is logic '1', it means that the data stored in the cache line has not yet been written back to the main memory, that is, the high bandwidth memory 1400. Accordingly, the cache controller 1311 determines whether a clean line exists by searching for a cache line whose dirty bit state is logic '0'. If the clean line exists ('Yes' direction), the procedure moves to step S345. On the other hand, if the clean line does not exist ('No' direction), the procedure moves to step S350.

In step S345, the cache controller 1311 searches for and selects a victim line for cache replacement.

In step S350, the cache controller 1311 directly writes the write-requested data into the high-bandwidth memory 1400 without passing through the cache. This procedure eliminates the need to consider the state of cache lines, reducing the number of commands issued.

In step S360, the cache controller 1311 writes the write-requested data to the target line.

In the foregoing, the cache bypassing operation of stopping the cache replacement operation of the cache line and directly writing data into the high-bandwidth memory 1400 when a cache miss occurs and there is no longer a clean line has been described. As described above, when write-back is performed because there is no clean line in the cache, the number of command issuances can be drastically reduced through the cache bypassing function. Therefore, the cache bypassing function of the present invention can provide a highly efficient cache management means.

Figure 8:
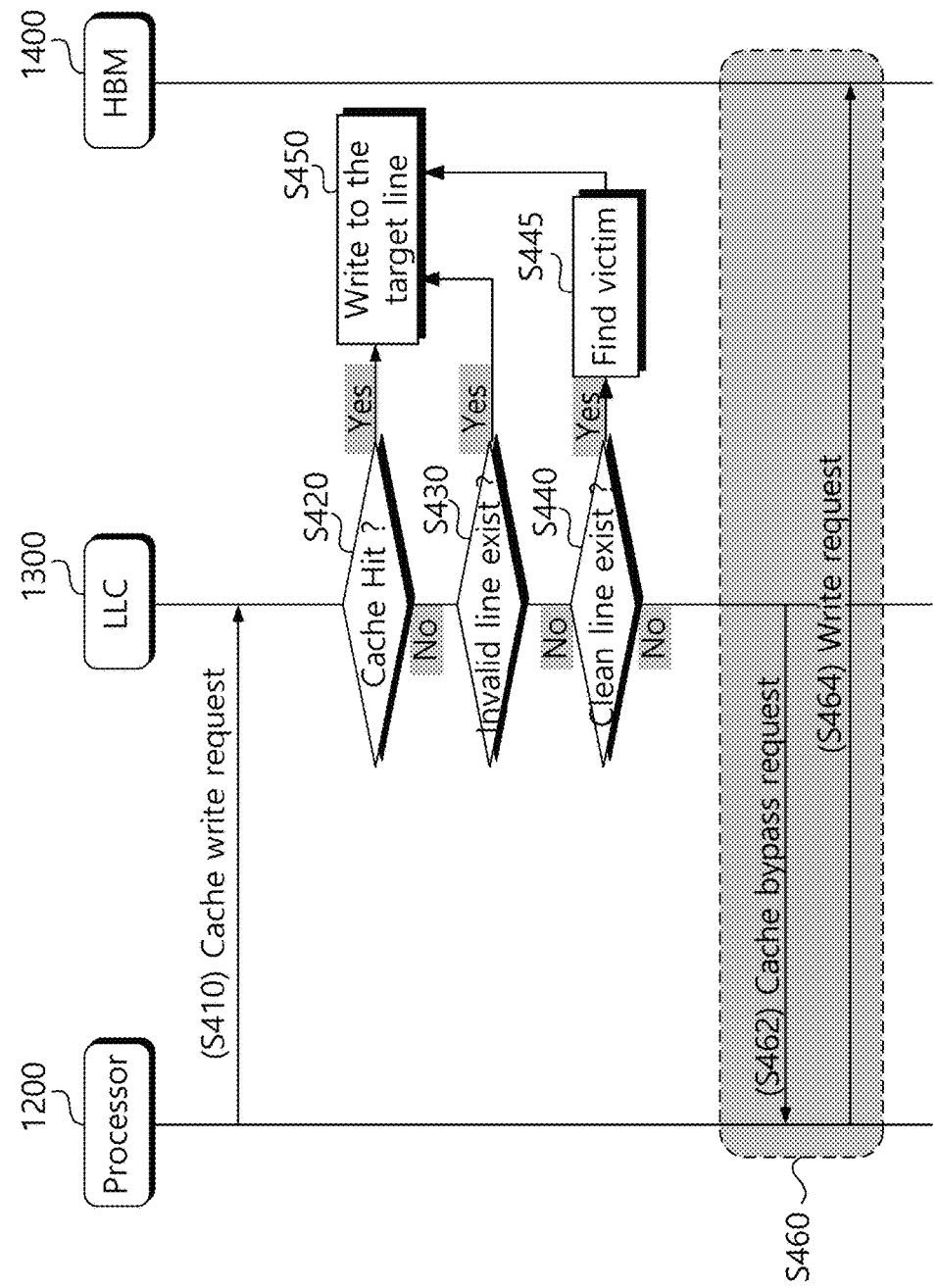
FIG. 8 is a diagram briefly illustrating cache bypassing that occurs when a cache write request is made according to some embodiments of the present invention.

FIG. 8 is a diagram briefly illustrating a cache bypassing operation that occurs when a cache write request is made according to some embodiments of the present invention. Referring to FIG. 8, if there is no clean line in a cache miss situation, the last level cache (1310, see FIG. 3) performs a cache bypassing operation of writing directly to the high-bandwidth memory (1400, see FIG. 2) instead of replacing the cache.

In step S420, the cache controller 1311 receives the cache write request, searches tags and set indices of cache lines, and determines whether a cache hit or a cache miss. If a matched cache line exists ('Yes' direction), the cache controller 1311 writes or updates write-requested data using the cache line determined as a cache hit as a target line (S450). On the other hand, in the case of a cache miss ('No' direction), the procedure moves to step S430.

In step S430, the cache controller 1311 searches whether an invalid line exists among cache lines of a corresponding set index. If an invalid line exists ('Yes' direction), the cache controller 1311 writes write-requested data using the invalid line as a target line (S450). On the other hand, if there is no invalid line ('No' direction), the procedure moves to step S440.

In step S440, the cache controller 1311 searches whether a clean line for replacing the cache exists. If the clean line exists ('Yes' direction), the procedure moves to step S445. On the other hand, if there is no clean line ('No' direction), the process moves to step S460 for cache bypassing.

In step S445, the cache controller 1311 searches for and selects a victim line for cache replacement among clean lines. The victim line may be selected using a selection method such as LRU or FIFO, for example. When the selection of the victim line is completed, the cache controller 1311 writes write-requested data using the victim line as a target line (S450).

In step S460, the cache controller 1311 performs cache bypassing of write-requested data. For example, in step S462, the cache controller 1311 requests the processor 1200 to bypass the cache for write-requested data. Then, in step S464, the processor 1200 will directly write the write-requested data into the high-bandwidth memory 1400 without passing through the cache.

In the above, the cache bypassing operation upon the cache write request has been described. As described above, when a clean line does not exist in the cache miss situation, the cache bypassing operation in which the processor 1200 directly writes data into the high-bandwidth memory 1400 may be performed instead of a cache replacing operation of the cache line.

Figure 9:
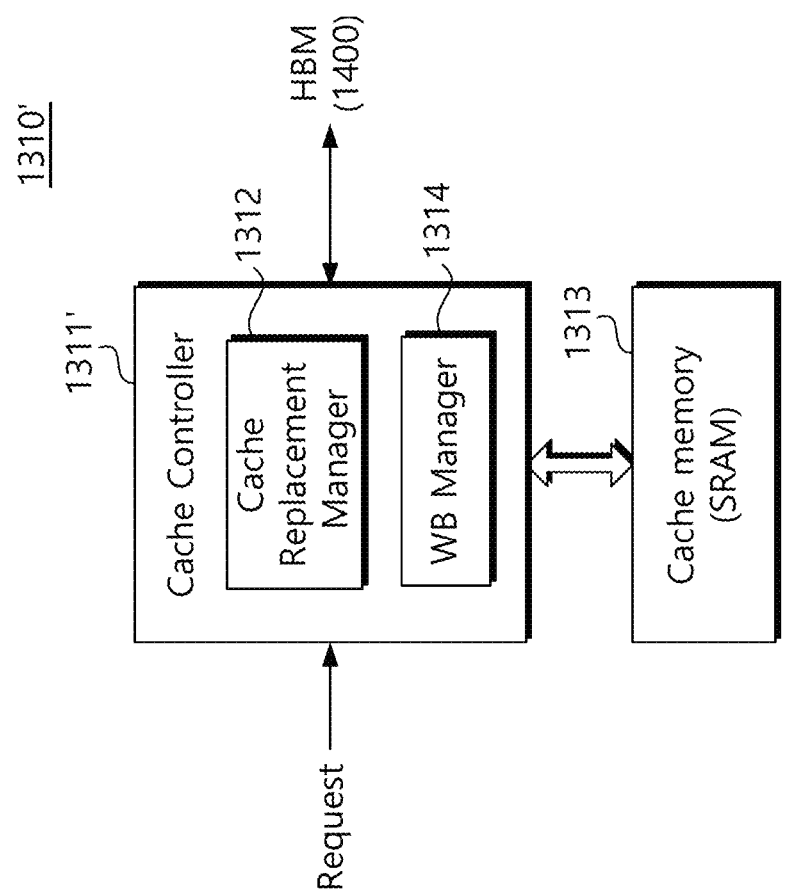
FIG. 9 is a block diagram showing some embodiments of the last level cache LLC of FIG. 2.

FIG. 9 is a block diagram showing some embodiments of the last level cache LLC of FIG. 2. Referring to FIG. 9, a last level cache 1310 may include a cache controller 1311' and a cache memory 1313. The cache controller 1311' may include a cache replacement manager 1312 and a write-back manager 1314. The cache controller 1311', the cache replacement manager 1312, the write-back manager 1314, and the cache memory 1313 may be implemented as circuits that include hardware and/or software.

The cache controller 1311' controls the cache memory 1313 to provide a cache function according to the memory request of the processor 1200. The cache controller 1311' may search whether given data exists in the last level cache 1310' according to the memory request of the processor 1200. To this end, the cache controller 1311 identifies whether the requested data exists in the cache using a set index, tag, or the like. That is, the cache controller 1311' identifies hit or miss of the requested data. Also, the cache controller 1311' may arrange a plurality of cache lines in one set index as a cache placement policy.

The cache controller 1311' may include a cache replacement manager 1312 that performs a cache bypassing function. The cache replacement manager 1312 may control the cache memory 1313 in which cache lines are configured using an algorithm such as LRU or FIFO. When a cache miss occurs, the cache replacement manager 1312 fills a clean line among cache lines with new cache data. However, in a situation where there is no clean line, the cache replacement manager 1312 selects one of the cache lines (victim line). Generally, if the victim line in the selected dirty state is valid, the cache controller 1311' writes the victim line into the high-bandwidth memory 1400, which is the main memory, and writes the requested data to the victim line. However, the cache replacement manager 1312 of the present invention performs a cache bypassing function instead of replacing a cache line in a situation where a clean line does not exist. That is, the cache replacement manager 1312 directly writes write-requested data into the high-bandwidth memory 1400 without passing through the cache memory 1313. In some embodiments, the cache replacement manager 1312 may 1312 may directly read read-requested data from the high-bandwidth memory 1400 without passing through the cache memory 1313 and transfer the read-requested data to the processor 1200. That is, the cache replacement manager 1312 directly writes or reads write-requested data or read-requested cache data to or from the high-bandwidth memory 1400 in the absence of a clean line.

The write-back manager 1314, also referred to as a write-back manager circuit, writes back dirty lines in a refresh operation period of the high-bandwidth memory 1400. For example, the write-back manager 1314 may monitor a refresh command provided from the processor 1200. When a refresh command is detected, the write-back manager 1314 may perform write-back of dirty lines during a refresh period.

For example, the write-back manager 1314 may detect an all-bank refresh command. Then, the write-back manager 1314 may write-back the dirty lines included in the cache lines as much as possible during the refresh timing tREFab at which the all-bank refresh is executed. In some embodiments, when a per-bank refresh command is detected, the write-back manager 1314 may write back the dirty lines to unselected banks during the refresh timing tREFpb at which the per-bank refresh operation is executed.

The cache controller 1311' described above may write back dirty lines in the cache as much as possible during the idle time of the high bandwidth memory 1400. Accordingly, a delay occurring in writing back dirty lines may be hidden from the processor 1200. In addition, the refresh timing has been exemplified as an example of the idle time of the high-bandwidth memory 1400, but the present invention is not limited thereto. It will be appreciated that write-back of dirty lines by the cache controller 1311' may occur at various idle times, such as when a power mode is switched to a power saving mode.

Figure 10:
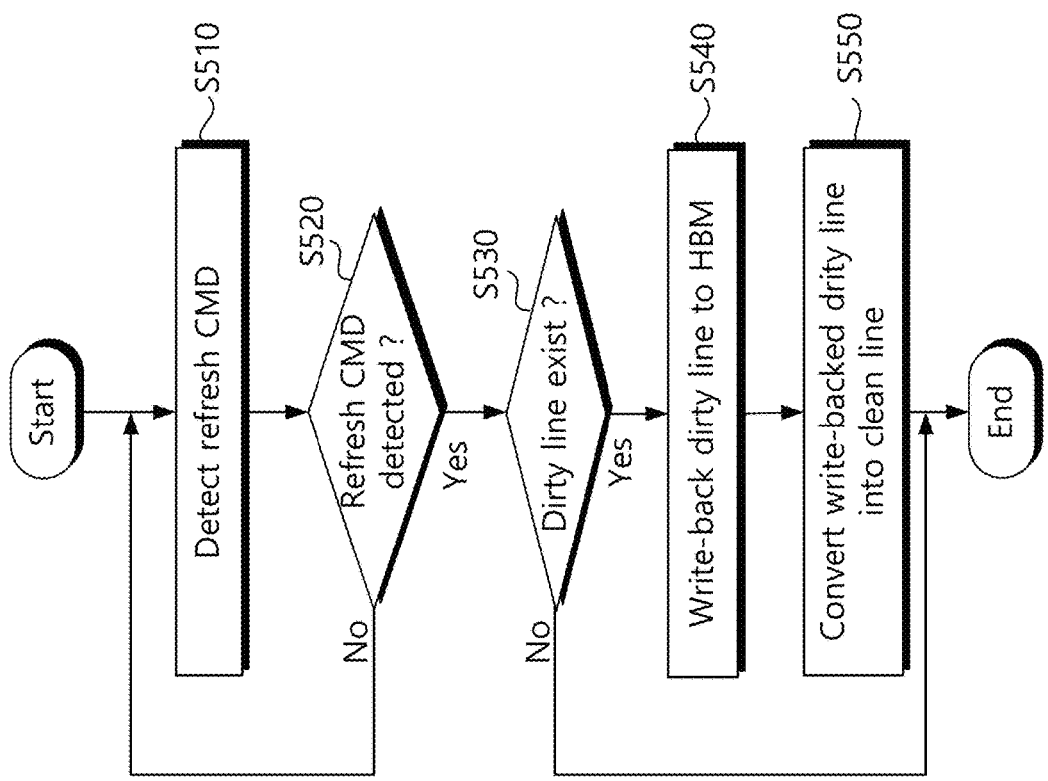
FIG. 10 is a flowchart briefly illustrating a write-back operation of dirty lines performed by the cache controller of FIG. 9.

FIG. 10 is a flowchart briefly illustrating a write-back operation of dirty lines performed by the cache controller of FIG. 9. Referring to FIGS. 9 and 10, the number of clean lines may be secured by writing back dirty lines in the cache memory as much as possible during a memory idle time such as a refresh operation.

In step S510, the write-back manager 1314 monitors a command from the processor 1200. The write-back manager 1314 detects whether a refresh command exists among the commands of the processor 1200. For example, the write-back manager 1314 can detect whether an all-bank refresh ABR command or a per-bank refresh PBR command was issued.

In step S520, the write-back manager 1314 performs branching operation according to whether a refresh command is detected. If the refresh command is detected ('Yes' direction), the procedure moves to step S530. On the other hand, if the refresh command is not detected ('No' direction), the process returns to step S510 to continue monitoring the refresh command.

In step S530, the write-back manager 1314 checks whether a dirty line exists among cache lines. If there is no more dirty line among the cache lines ('No' direction), all procedures for writing back the dirty line are terminated. On the other hand, if at least one dirty line exists among the cache lines ('Yes' direction), the procedure moves to step S540.

In step S540, the write-back manager 1314 writes back as many dirty lines as possible to the high-bandwidth memory 1400 among the cache lines.

In step S550, the write-back manager 1314 converts the written-back dirty line into a clean line. For example, a dirty bit of a written-back dirty line may be inverted to '0'.

As described above, the cache controller 1311' may write back dirty lines in the cache as much as possible during the idle time of the high-bandwidth memory 1400. The number of clean lines can be secured through write-back of dirty lines, which can contribute to maximally suppressing the occurrence of the cache bypassing operation according to the present invention.

Figure 11:
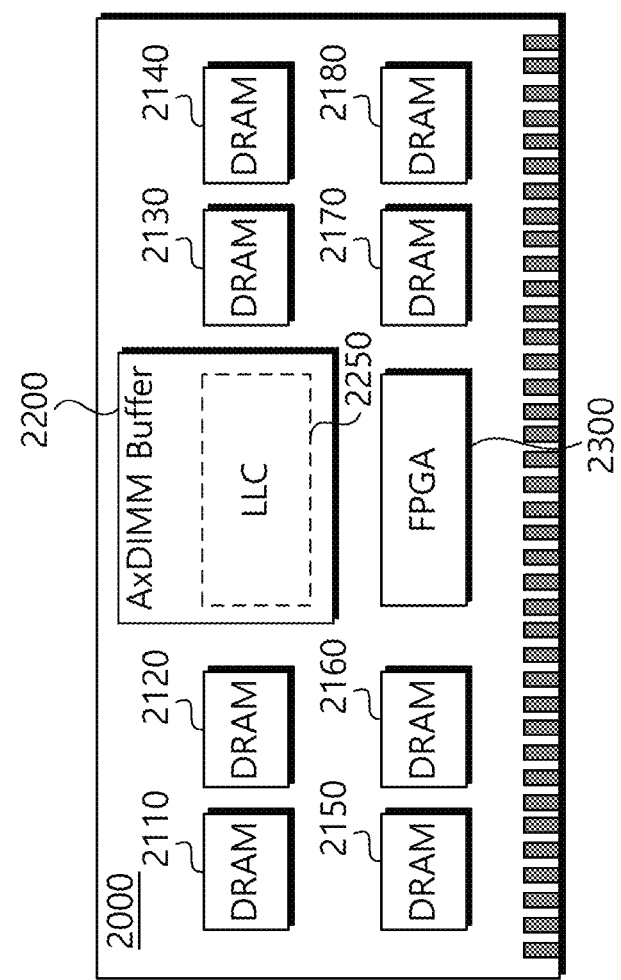
FIG. 11 is a diagram showing a memory system according to some embodiments of the present disclosure.

FIG. 11 is a diagram showing a memory system according to some embodiments of the present invention. Referring to FIG. 11, an accelerated double-sided memory module 2000 (hereinafter referred to as AxDIMM) is shown as an example of a memory system. The AxDIMM 2000 may include a plurality of DRAMs 2110 to 2180, an AxDIMM buffer 2200, and an FPGA 2300.

The FPGA 2300 may drive various software or AI engines loaded into the AxDIMM buffer 2200. The FPGA 2300 may drive, for example, the artificial intelligence model 3250, and may process a requested natural language processing task inside the AxDIMM 2000.

The AxDIMM buffer 2200 may include a last level cache LLC of a host or processor. As described above, the last level cache LLC may perform a cache replacement policy including a cache bypassing function. The last level cache LLC fills a clean line with new cache data among cache lines for cache replacement. However, in a situation where there is no clean line, the last level cache LLC performs a cache bypassing function instead of replacing the cache line.

For cache bypassing, the last level cache LLC skips the data exchange procedure between the cache lines and the DRAMs 2110 to 2180, and directly writes or reads cache data to the DRAMs 2110 to 2180. That is, when the clean line no longer exists, the last level cache LLC may skip the management of cache lines and directly access the DRAMs 2110 to 2180.

When an algorithm such as LRU or FIFO generally used for cache replacement is performed, the number of instructions issued to the DRAMs 2110 to 2180 increases rapidly according to locations of victim lines and target lines. However, if cache bypassing is used, the number of added commands can be drastically reduced.

The above are specific example embodiments for carrying out the present invention. In addition to the above-described embodiments, the present invention may include simple design changes or easily changeable embodiments. In addition, the present invention will include techniques that can be easily modified and implemented using the embodiments. Therefore, the scope of the present invention should not be limited to the above-described embodiments, and should be defined by the claims and equivalents of the claims of the present invention as well as the claims to be described later.

What is claimed is:

1. A memory system, comprising:
   at least one high-bandwidth memory device configured to store data or output stored data according to an access command;
   a processor configured to generate the access command for the high-bandwidth memory device; and
   a logic die on or under the high-bandwidth memory device and including a last level cache that is configured to provide a cache function to the processor,
   wherein the last level cache is configured to perform a cache bypassing operation to directly access the high-bandwidth memory device without a cache replacement operation when an invalid line and a clean line do not exist in a cache miss state, in response to a cache read or cache write request by the processor, and
   wherein the last level cache comprises:
      an SRAM including a plurality of cache lines; and
      a cache controller circuit configured to manage the plurality of cache lines based on the cache bypassing operation, in response to the cache read request or the cache write request.

2. The memory system of claim 1, wherein in response to the cache read request, the last level cache is configured to read requested data from the high-bandwidth memory device and configured to directly transfer the requested data to the processor.

3. The memory system of claim 1, wherein in response to the cache write request, the last level cache is configured to write write-requested data to the high-bandwidth memory device without the write-requested data passing through cache lines.

4. The memory system of claim 1, wherein the cache controller circuit comprises: a cache replacement manager circuit configured to determine a cache miss based on a set index and a tag information included in the cache read request or the cache write request, and configured to check whether the invalid line and the clean line exist among the cache lines associated with the set index.

5. The memory system of claim 4, wherein the cache replacement manager circuit is configured to activate the cache bypassing operation when the invalid line and the clean line do not exist in the set index in a cache miss state.

6. The memory system of claim 1, wherein the cache controller circuit includes a write-back manager circuit that is configured to control dirty lines included in the plurality of cache lines to be written-back during an idle time of the high-bandwidth memory device.

7. The memory system of claim 6, wherein the write-back manager circuit is configured to detect a refresh command from the processor and configured to write-back the dirty lines in response to the refresh command.

8. The memory system of claim 6, wherein the write-back manager circuit is configured to write-back the dirty lines in a power saving mode of the processor or the high-bandwidth memory device.

9. A method for managing a cache memory included in a buffer die of a high-bandwidth memory, the method comprising:
   receiving a cache request from a processor;
   determining a cache miss based on a set index and a tag information included in the cache request;
   identifying whether an invalid line or a clean line exists among cache lines associated with the set index, when the cache miss has been determined;
   when the invalid line or the clean line does not exist, writing cache requested data to the high-bandwidth memory by bypassing the cache memory and transferring the cache requested data to the processor from the high-bandwidth memory; and
   writing back dirty lines included in a plurality of cache lines to the high-bandwidth memory during an idle time of the high-bandwidth memory.

10. The method of claim 9, further comprising:
    fetching the cache requested data from the high-bandwidth memory by designating the invalid line as a victim line if the invalid line exists.

11. The method of claim 9, further comprising:
    identifying the clean line as a victim line if the clean line exists; and
    fetching and filling the cache requested data to the victim line from the high-bandwidth memory.

12. The method of claim 9, wherein the idle time is determined based on a refresh command or a power saving state of the high-bandwidth memory.

13. A memory system, comprising:
    a memory device configured to store or output data according to an access command;
    a processor configured to generate the access command for the memory device; and
    a cache memory configured to provide a cache function to the processor and configured to manage a plurality of cache lines according to a cache replacement policy,
    wherein when an invalid line and a clean line do not exist in the plurality of cache lines after a cache miss, the cache memory is configured to perform a cache bypassing operation to directly access the memory device without replacing a cache in response to a cache read request or cache write request from the processor,
    wherein the cache memory comprises a cache controller circuit configured to manage the plurality of cache lines based on the cache bypassing operation in response to the cache read request or the cache write request, and wherein the cache controller circuit comprises a write-back manager circuit configured to control dirty lines included in the plurality of cache lines to be written-back during an idle time of the memory device.

14. The memory system of claim 13, wherein the cache memory comprises an SRAM comprising the plurality of cache lines.

15. The memory system of claim 13, wherein the cache controller circuit comprises:
a cache replacement manager circuit configured to determine the cache miss based on a set index and a tag information included in the cache read request or cache write request, and configured to check whether the invalid line and the clean line exist among the plurality of cache lines associated with the set index.

16. The memory system of claim 15, wherein the write-back manager circuit is configured to detect a refresh command from the processor and configured to write-back the dirty lines in response to the refresh command.

17. The memory system of claim 13, wherein the write-back manager circuit is configured to write-back the dirty lines in a power saving mode of the processor or the memory device.

\* \* \* \* \*